(12) United States Patent
Yamada et al.

(10) Patent No.: US 10,343,938 B2
(45) Date of Patent: Jul. 9, 2019

(54) MAGNETIC SEPARATION DEVICE AND RAW WATER TREATMENT APPARATUS

(71) Applicant: HITACHI, LTD., Tokyo (JP)

(72) Inventors: Manabu Yamada, Tokyo (JP); Kazutaka Fukumoto, Tokyo (JP); Hiroyoshi Shimizu, Tokyo (JP); Kei Hayashida, Tokyo (JP); Hisashi Isogami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 136 days.

(21) Appl. No.: 15/527,649

(22) PCT Filed: Nov. 2, 2015

(86) PCT No.: PCT/JP2015/080889
§ 371 (c)(1),
(2) Date: May 17, 2017

(87) PCT Pub. No.: WO2016/080179
PCT Pub. Date: May 26, 2016

(65) Prior Publication Data
US 2017/0320758 A1    Nov. 9, 2017

(30) Foreign Application Priority Data
Nov. 19, 2014    (JP) .................................. 2014-234088

(51) Int. Cl.
*C02F 1/48*    (2006.01)
*C02F 1/52*    (2006.01)
(Continued)

(52) U.S. Cl.
CPC .................. *C02F 1/48* (2013.01); *B03C 1/01* (2013.01); *B03C 1/14* (2013.01); *C02F 1/488* (2013.01);
(Continued)

(58) Field of Classification Search
CPC ............ C02F 1/488; C02F 1/48; C02F 1/481; C02F 1/5236; C02F 1/5245; C02F 1/56;
(Continued)

(56) References Cited

U.S. PATENT DOCUMENTS 6,478,955 B1 *  11/2002  Saho ..................... B03C 1/14
                                              209/213
2005/0230299 A1 * 10/2005  Saho ..................... B03C 1/284
                                              210/223

(Continued)

FOREIGN PATENT DOCUMENTS

CA    2 639 885 A1    4/2009
GB     736332 A       9/1955
(Continued)

OTHER PUBLICATIONS

Jan. 12, 2016 International Search Report issued in International Patent Application No. PCT/JP2015/080889.
(Continued)

*Primary Examiner* — Claire A Norris
(74) *Attorney, Agent, or Firm* — Oliff PLC (57) ABSTRACT

A magnetic separation device includes magnetic separation units in each of which a flow direction of raw water in a separation vessel is set to the same direction as a rotation direction of a magnetic drum. In the left-side magnetic separation unit, a raw water feeding channel is connected to the left side of the separation vessel, so that the raw water flows from left to right in the separation vessel and the treated water flows out of a discharge channel. The magnetic drum rotates in a counter clockwise direction. In the right-side magnetic separation unit, the raw water feeding channel is connected to the right side of the separation vessel, so that the raw water flows from right to left in the separation vessel (Continued)

and the treated water flows out of the discharge channel. The magnetic drum also rotates in the clockwise direction.

14 Claims, 12 Drawing Sheets

(51) Int. Cl.
*B03C 1/01* (2006.01)
*B03C 1/14* (2006.01)
*C02F 1/56* (2006.01)

(52) U.S. Cl.
CPC .......... *C02F 1/5236* (2013.01); *C02F 1/5245* (2013.01); *B03C 2201/18* (2013.01); *C02F 1/481* (2013.01); *C02F 1/56* (2013.01)

(58) Field of Classification Search
CPC ....... B03C 2201/18; B03C 1/12; B03C 1/286; B03C 1/00; B03C 1/03; B03C 1/145; B03C 1/247; B03C 1/01; B03C 1/14; B01D 35/06
USPC .... 210/223, 222, 695, 223.1, 213, 214, 226, 210/232
See application file for complete search history.

(56) References Cited

U.S. PATENT DOCUMENTS

| | | | |
|---|---|---|---|
| 2008/0164183 A1* | 7/2008 | Marston | B03C 1/03 209/214 |
| 2011/0139721 A1 | 6/2011 | Miyabayashi et al. | |
| 2011/0168639 A1* | 7/2011 | Isogami | C02F 1/488 210/695 |
| 2011/0215041 A1* | 9/2011 | Isogami | C02F 1/48 210/205 |

FOREIGN PATENT DOCUMENTS

| | | |
|---|---|---|
| JP | 2001-010809 A | 1/2001 |
| JP | 2005-230666 A | 9/2005 |
| JP | 2009-101341 A | 5/2009 |
| JP | 2009-189964 A | 8/2009 |
| JP | 2010-227902 A | 10/2010 |
| JP | 2010-234327 A | 10/2010 |
| JP | 2011-121033 A | 6/2011 |
| JP | 2011-183271 A | 9/2011 |

OTHER PUBLICATIONS

May 24, 2018 Examination Report issued in Gulf Cooperation Council Patent Application GC 2015-30414.
Jun. 26, 2018 Office Action issued in Japanese Patent Application No. 2014-234088.

\* cited by examiner

MAGNETIC SEPARATION DEVICE AND RAW WATER TREATMENT APPARATUS

TECHNICAL FIELD

The present invention relates to a magnetic separation device and a raw water treatment apparatus.

BACKGROUND ART

Japanese Unexamined Patent Application Publication No.2011-183271 (Patent Literature 1) is known as a background art in the technical field. The publication describes "the separator 30 has a magnetic drum configuration in which the magnetic group 34 is arranged close to the inner circumferential face of the drum rotor 32, the drum rotor 32 is integrated with the magnetic group 34 to rotate in the same direction as the flow direction of the raw water 38, and the scraping brush 52 is arranged at a position where the scraper 46 contacts the face of the drum rotor 32 (see abstract). However, the publication fails to disclose or suggest increasing (scaling up) treatment capability for the raw water with the magnetic drum configuration.

CITATION LIST

Patent Literature

Patent Literature 1: Japanese Unexamined Patent Application Publication No.2011-183271

SUMMARY OF THE INVENTION

Technical Problem

Patent Literature 1 described above also discloses a magnetic separation device including two drum rotors. However, the magnetic separation device includes the drum rotors arranged in series in the flow direction of the raw water and is not intended to increase (scale up) the treatment capability by arranging two magnetic separation devices.

The present invention therefore makes it an object thereof to provide a magnetic separation device and a raw water treatment apparatus that can increase treatment capability and can highly maintain quality of treated water by arranging a plurality of magnetic separation units.

Solution to Problem

In order to solve the above problem, the present invention provides, as one aspect thereof, a magnetic separation device including a plurality of magnetic separation units that are arranged in raw water having different flow directions, respectively, each magnetic separation unit including: a separation vessel that is supplied with the raw water containing a coagulated floc; a magnetic drum that is arranged in the separation vessel and rotated to magnetically adsorb the coagulated floc in the raw water; and a scraper that scrapes the coagulated floc adsorbed on a face of the magnetic drum, wherein a flow direction of the raw water in the separation vessel is set to the same direction as a rotation direction of the magnetic drum.

The present invention also provides, as another aspect thereof, a magnetic separation device including a plurality of magnetic separation units, each magnetic separation unit including: a separation vessel that is supplied with the raw water containing a coagulated floc; a magnetic drum that is arranged in the separation vessel and rotated to magnetically adsorb the coagulated floc in the raw water; and a scraper that scrapes the coagulated floc adsorbed on a face of the magnetic drum, wherein a magnet arranged in one magnetic separation unit is set to have the same polarity as a corresponding magnet arranged in another magnetic separation unit at a position where the magnet in one magnetic separation unit approaches closest to the corresponding magnet in another adjacent magnetic separation unit, as the magnetic separation units rotate.

Advantageous Effects of the Invention

According to one aspect of the present invention, a magnetic separation device and a raw water treatment apparatus can be provided which can substantially increase treatment capability for raw water.

According to another aspect of the present invention, a magnetic separation device and a raw water treatment apparatus can be provided which can adsorb coagulated flocs by large magnetic force and can highly maintain quality of treated water.

Other subjects, configurations and advantageous effects will be apparent from description of embodiments below.

BRIEF DESCRIPTION OF DRAWINGS

FIGS. 2A and 2B are explanatory views for a magnetic separation device according to the first embodiment of the present invention, in which

FIGS. 4A and 4B are explanatory views for a magnetic separation device according to the second embodiment of the present invention, in which

FIGS. 7A and 7B are explanatory views for a magnetic separation device according to the third embodiment of the present invention, in which

DESCRIPTION OF EMBODIMENTS

Embodiments of the present invention will be described below with reference to the accompanying drawings.

<First Embodiment>

In the present embodiment, an exemplary magnetic separation device, as well as a raw water treatment apparatus, will be described that includes a plurality of magnetic separation units to allow for substantially increasing treatment capability for the raw water.

Figure 1:
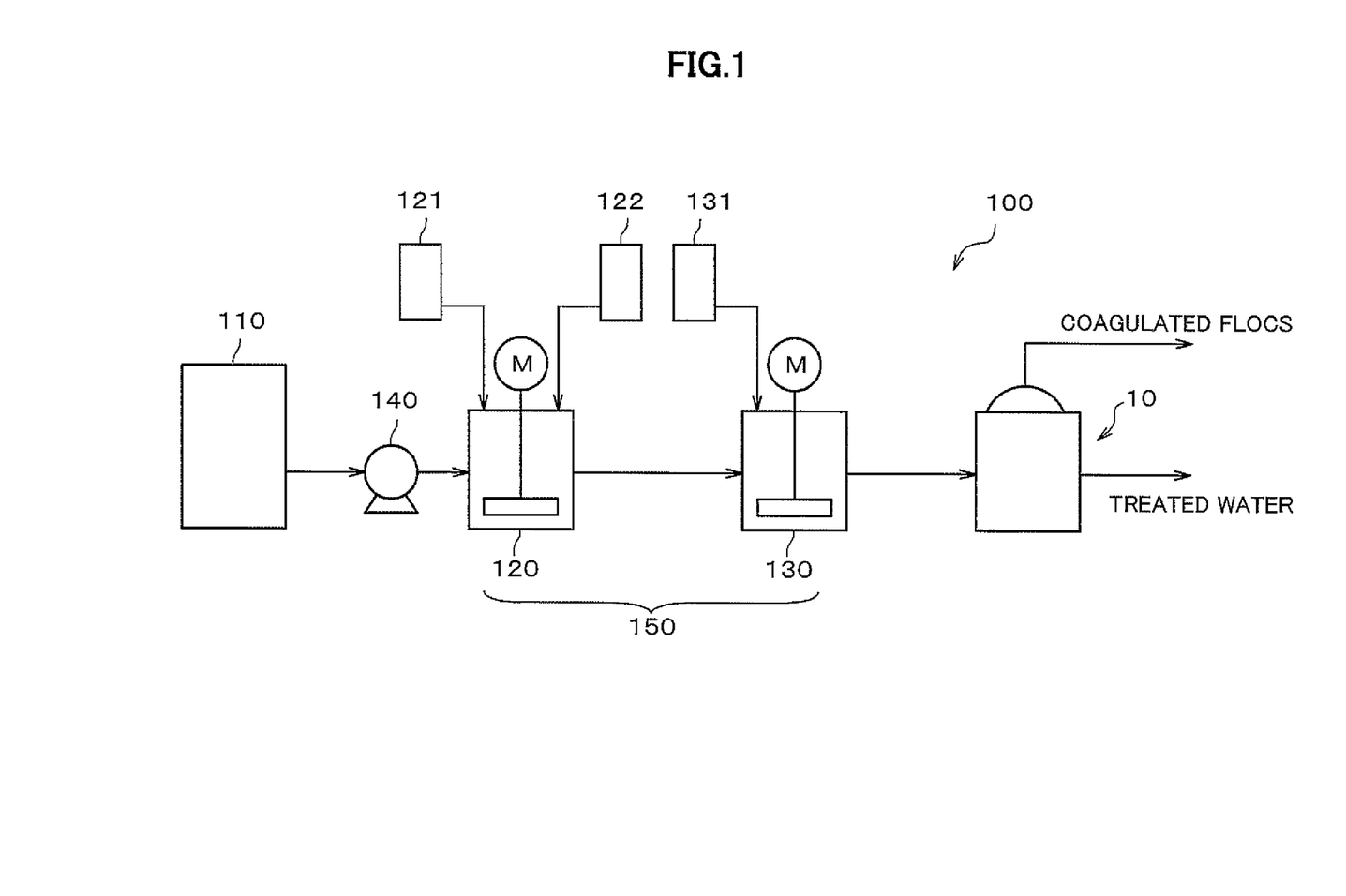
FIG. 1 is a diagram showing a schematic configuration of a raw water treatment apparatus according to first to sixth embodiments of the present invention.

FIG. 1 is a schematic diagram showing a configuration of a raw water treatment apparatus 100 according to a first embodiment (the same applies to second to sixth embodiments). The raw water treatment apparatus 100 includes, from upstream to downstream of a treatment system for the raw water, a raw water tank 110, a rapid agitation vessel 120, a slow agitation vessel 130 and a magnetic separation device 10.

The raw water to be treated (raw water containing suspended substances, oil, heavy metal and the like) is first fed from the raw water tank 110 to the rapid agitation vessel 120 by a raw water pump 140. Then, in the rapid agitation vessel 120, inorganic coagulant, such as PAC (polyaluminum chloride), ferric sulfate, ferric chloride, or aluminum sulfate, is added from an inorganic coagulant vessel 121 by an inorganic coagulant injection pump (not shown), and agitation is rapidly performed. The rapid agitation increases frequency of collision of suspended substances or oil particles, and multiple minute flocs called microflocs are formed by an effect of the coagulant. Then, in the rapid agitation vessel 120 or just outside the rapid agitation vessel 120, magnetic powder such as magnetite is added to the raw water from a magnetic powder vessel 122 by a magnetic powder injection pump (not shown). The raw water containing the magnetic powder and the microflocs flows out of the rapid agitation vessel 120 into the slow agitation vessel 130. High molecular coagulant is injected from a high molecular coagulant vessel 131 into the slow agitation vessel 130 by a high molecular coagulant injection pump (not shown), and agitation is slowly performed in the slow agitation vessel 130 to grow coagulated flocs. The high molecular coagulant in this case is desirably anionic coagulant, and for example, polyacrylamide is suitable for the coagulant. Polyacrylamide, if selected, maybe stored in a form of powder and injected into the high molecular coagulant vessel 131 by a feeder for agitation. In the above example, the inorganic coagulant and the anionic high molecular coagulant are used, but a case of using cationic high molecular coagulant alone without using the inorganic coagulant also provides similar advantageous effects as described below. Thus, the rapid agitation vessel 120 and the slow agitation vessel 130 constitute a coagulator 150 that generates the coagulated flocs in the raw water by the coagulant and the magnetic powder being added for agitation. The coagulated flocs formed as described above are fed from the slow agitation vessel 130 to the magnetic separation device 10, where the coagulated flocs are separated from the treated water. The raw water treatment apparatus 100 performs the raw water treatment as described above.

Figure 2A:
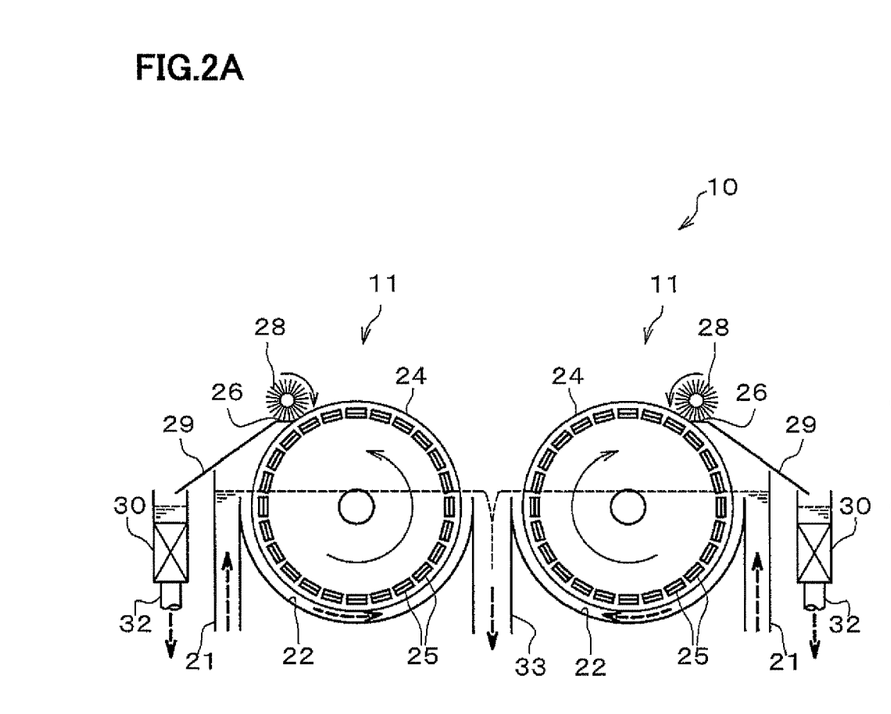
FIG. 2A is a front view of the magnetic separation device and FIG. 2B is a right side view of the magnetic separation device.
Figure 2B:
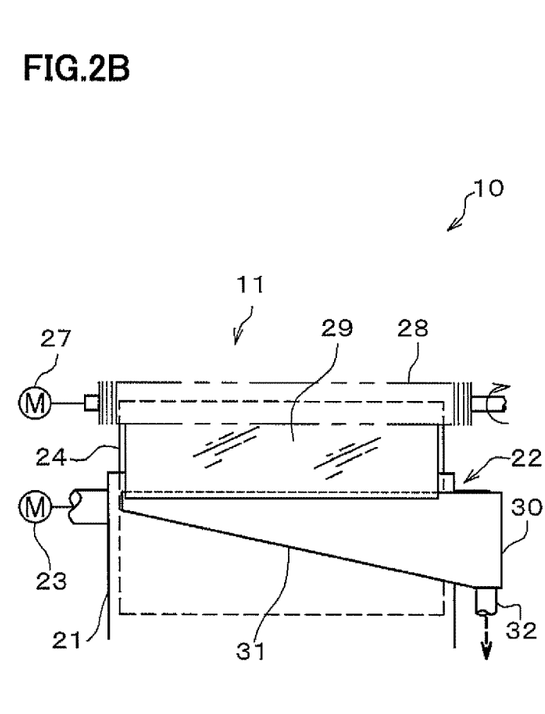

Next, the magnetic separation device 10 will be described. FIG. 2A is a front view and FIG. 2B is a right side view of the magnetic separation device 10. The magnetic separation device 10 includes two magnetic separation units 11. Each magnetic separation unit 11 includes a separation vessel 22 that has a semi-arc shape as a longitudinal cross section in a transverse direction and is supplied with the raw water from the coagulator 150 via a raw water feeding channel 21, and a cylindrical or columnar magnetic drum 24 of which lower part, with a rotation axis in a horizontal direction, is accommodated in the separation vessel 22 and which is rotated by a motor 23. The magnetic drum 24 includes a number of magnets 25 along its inner circumferential face.

The raw water is supplied via the raw water feeding channel 21 to the separation vessel 22 and the the magnetic drum 24 is rotated with the lower part being submerged in the raw water in the separation vessel 22. At this time, magnetic force of the magnets 25 adsorbs the coagulated flocs in the raw water onto a face of the magnetic drum 24. The coagulated flocs adsorbed on the face of the magnetic drum 24 come up above the raw water in the separation vessel 22 as the magnetic drum 24 rotates. A scraper 26 that scrapes the coagulated flocs on the magnetic drum 24 is arranged to come in contact with the upper face of the magnetic drum 24 which is not submerged in the raw water. The coagulated flocs that have been scraped by and are remaining on the scraper 26 are brushed off by a brush 28 rotationally driven by a motor 27 toward a discharge side for the coagulated flocs. Specifically, the coagulated flocs brushed off by the brush 28 fall down on a scraper guide 29 that is connected to the scraper 26 and declines toward outside the magnetic drum 24, and then, drop in a trough 30 through which the coagulated flocs (sludge) are discharged. A bottom 31 of the trough 30 declines from left to right in FIG. 2B. The coagulated flocs dropped in the trough 30 move from left to right on the bottom 31 by gravity to be discharged outside via a sludge discharge channel 32 connected to a right end of the bottom 31. Thus, the raw water (treated water) after the adsorption treatment for the coagulated flocs by the magnetic drum 24 flows down from the separation vessel 22 through a treated water discharge channel 33 connected to the separation vessel 22 to be discharged outside.

An elongated single magnetic drum 24 can be considered to improve the treatment capability of the magnetic separation device 10 for the raw water. However, in this case, other members such as the scraper 26 and the brush 28 need to be elongated as well as the magnetic drum 24. This causes each elongated member likely to have torsion, deflection and the like, which deteriorates dimensional accuracy of each member. Further, in this case, there is another problem that the whole configuration of the magnetic separation device 10 will be elongated (increased in size). Therefore, each member such as the magnetic drum 24 is preferable to be relatively short instead of being elongated, which improves balance of the apparatus and by which the apparatus can be easily produced.

In the present embodiment, a plurality of, two in this example, magnetic drums 24 that are relatively short are arranged instead of a single elongated magnetic drum, to substantially elongate the magnetic drum part as a whole, and to improve the treatment capability for the raw water without elongating a single magnetic drum and the like.

In the magnetic separation device 10 of the first embodiment, a plurality of, two in this example, magnetic separation units 11 are respectively arranged in the raw water flows in different directions. Each magnetic separation unit 11 is set such that a flow direction of the raw water in the separation vessel 22 is the same as a rotation direction of the magnetic drum 24. That is, as shown in FIG. 2A, for the left magnetic separation unit 11, the raw water feeding channel 21 is connected at left of the separation vessel 22, allowing the raw water to flow from left to right in the separation vessel 22 so that the treated water flows out through the treated water discharge channel 33. The magnetic drum 24 is rotated in a counter clockwise direction as shown in FIG. 2A so as not to move against the raw water flow. On the other hand, for the right magnetic separation unit 11, the raw water feeding channel 21 is connected at right of the separation vessel 22, allowing the raw water to flow from right to left in the separation vessel 22 so that the treated water flows out through the treated water discharge channel 33. The magnetic drum 24 is rotated in a clockwise direction as shown in FIG. 2A so as not to move against the raw water flow. The flow directions of the raw water, the treated water and the like are shown by arrows in FIG. 2A.

Further, in this example, each magnetic separation unit 11 includes the raw water feeding channel 21 at the outer right or left of the magnetic separation device 10 in FIG. 2A. The two magnetic separation units 11 are arranged to face each other on the discharge sides for the treated water in which the coagulated flocs have been adsorbed from the raw water. Specifically, the treated water discharge channel 33 of the two magnetic separation units 11 is commonly used for the two magnetic separation units 11.

Further, the magnet 25 arranged in one magnetic separation unit 11 is set to have the same polarity as the corresponding magnet 25 arranged in the other magnetic separation unit 11 at a position where the magnet 25 in one magnetic separation unit 11 approaches closest to the corresponding magnet 25 in the other adjacent magnetic separation unit 11 as the magnetic separation units 11 rotate.

Figure 3:
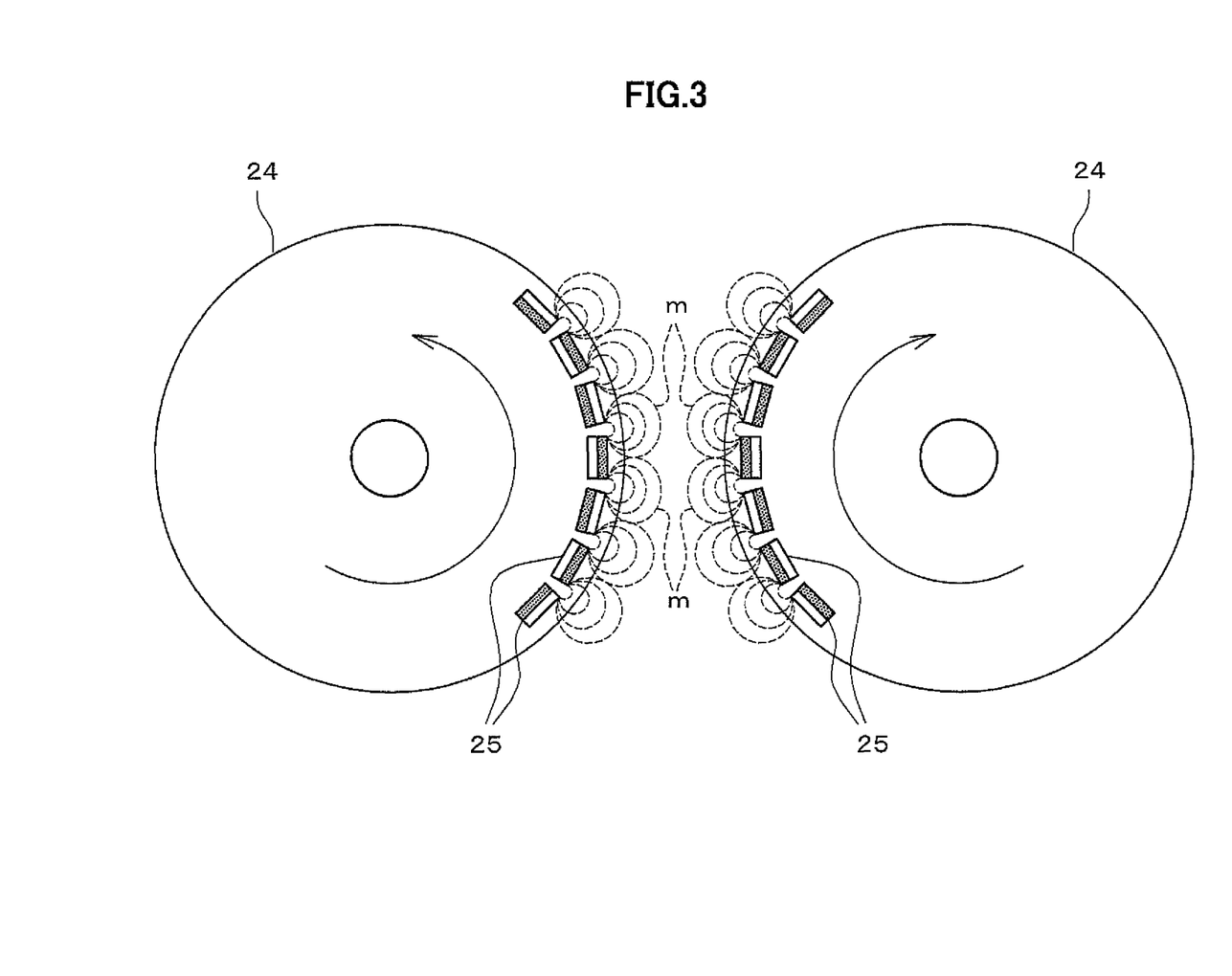
FIG. 3 is an explanatory view for magnetic fields generated between magnetic drums in the magnetic separation device according to the first embodiment of the present invention.
Figure 11:
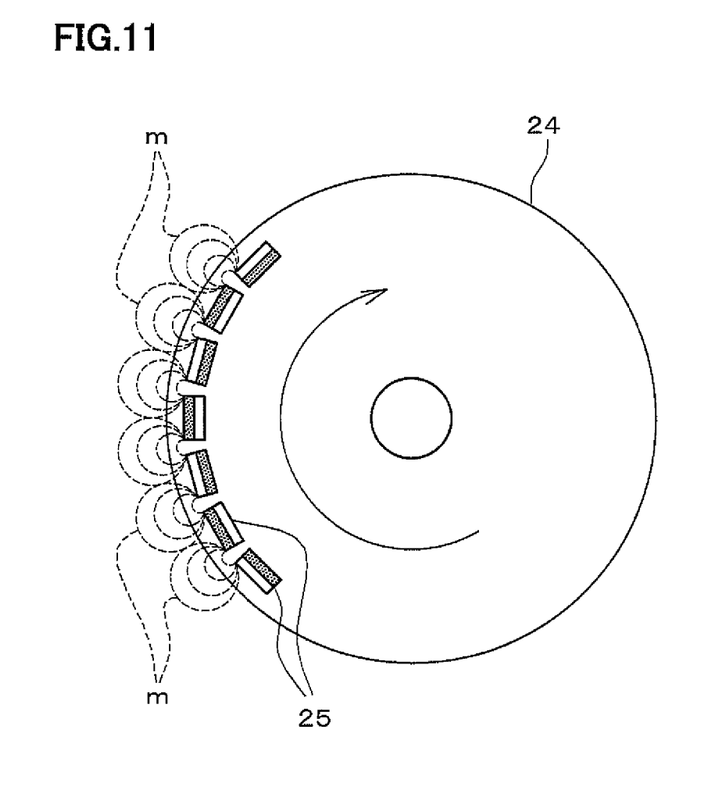
FIG. 11 is an explanatory view for a magnetic drum in a magnetic separation device as a comparative example.

This causes, as shown in FIG. 3, the magnetic force to concentrate on faces of the magnets 25 having the same polarity that come to close to each other between the two magnetic drums 24 (shown as a magnetic field m in FIG. 3), allowing the coagulated flocs to be adsorbed by greater magnetic force than that of a single magnetic drum (comparison example in FIG. 11). It is noted that, to obtain the concentration of the magnetic force caused by the magnets 25 having the same polarity, the magnets 25 of the magnetic separation units 11 adjacent to each other are suitably spaced apart at equal to or less than 400 mm at a position where the magnets 25 approaches closest.

It is noted that alignment of the magnets 25 having the same polarity is affected by attachment accuracy of the magnets 25 and synchronous accuracy of rotation of the adjacent magnetic drums 24, but an effect of the concentration of the magnetic force can be maintained by keeping a position shift amount due to the accuracy equal to or less than 40% of magnet size.

Figure 12:
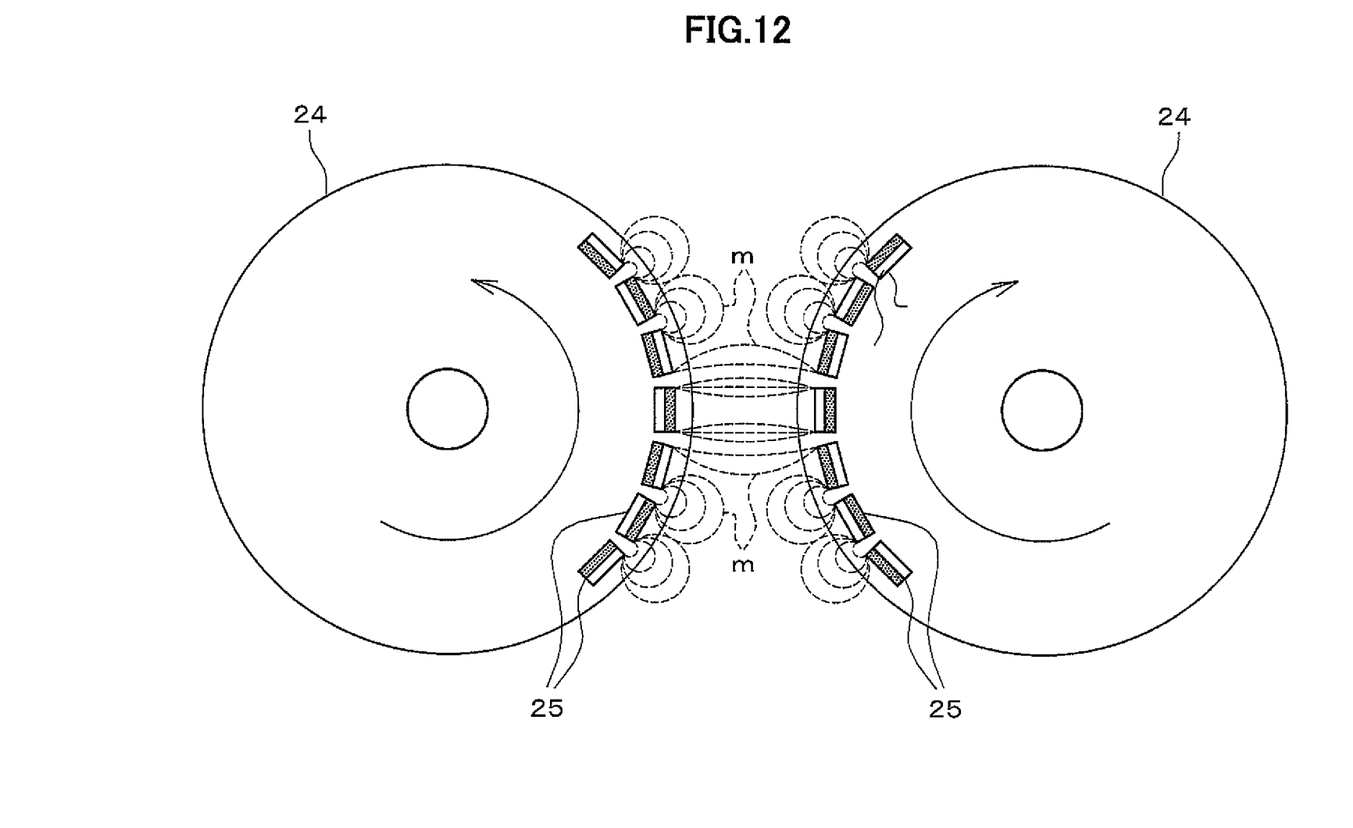
FIG. 12 is an explanatory view for magnetic drums in a magnetic separation device as another comparative example.

On the contrary, as shown in a comparison example in FIG. 12, in a case if the magnets 25 having different polarities facing each other between the magnet drums 24 come closer, the different polarities attract magnetically, to cause the magnetic force to be generated not only on the faces of the magnetic drums 24 but also between the magnetic drums 24, disturbing the adsorption of the coagulated flocs.

Thus, in the magnetic separation device 10 and the raw water treatment apparatus 100 of the first embodiment, each magnetic separation unit 11 is set such that the flow direction of the raw water in the separation vessel 22 is the same as the rotation direction of the magnetic drum 24, to allow the quality of the treated water to be highly maintained.

Further, in the magnetic separation device 10 and the raw water treatment apparatus 100 of the first embodiment, the magnetic force (magnetic field m in FIG. 3) is concentrated on the faces of the magnets 25 having the same polarity and being close to each other in the adjacent magnetic drums 24, to allow the coagulated flocs to be adsorbed by the greater magnetic force than that of the single magnetic drum 24 (comparison example in FIG. 11).

Therefore, according to the magnetic separation device 10 and the raw water treatment apparatus 100 of the first embodiment, the plurality of magnetic separation units 11 can enhance the treatment capability and can highly maintain the quality of the treated water.

Further, in the magnetic separation device 10 and the raw water treatment apparatus 100 of the first embodiment, the discharge sides of the two magnetic separation units 11 are arranged to face to each other, where the treated water is discharged after the coagulated flocs have been adsorbed from the raw water. That is, the treated water discharge channel 33 for the two magnetic separation units 11 is commonly used by the two magnetic separation units 11. In such an arrangement, the scrapers 26, the brushes 28 and the like can be arranged at the outer right or left in FIG. 2A in association with the rotation directions of the magnetic drums 24. Therefore, the troughs 30 can be arranged at the outer right or left in FIG. 2A. This allows maintenance for members such as the scrapers 26, the brushes 28, and the troughs 30 to be performed easily without being disturbed by the magnetic drums 24 and the like.

<Second Embodiment>

In this embodiment, an example of a magnetic separation device 200 and the raw water treatment apparatus 100 will be described which can discharge the coagulated flocs (sludge) easily.

Basic configurations and operations of the raw water treatment apparatus 100 of the present embodiment are common with those of the first embodiment as described with reference to FIG. 1, etc., and then detailed descriptions thereof will be omitted. Further, the magnetic separation device 200 of the present embodiment will be described to focus on differences from the magnetic separation device 10 of the first embodiment, and common members bear the same reference numerals to have detailed descriptions thereof omitted.

Figure 4A:
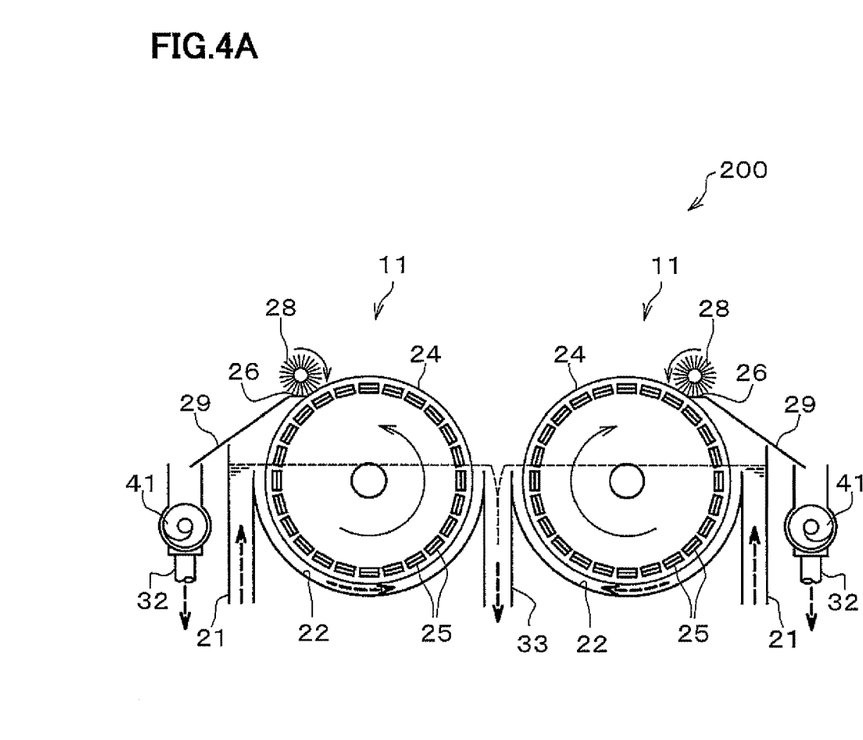
FIG. 4A is a front view of the magnetic separation device and FIG. 4B is a right side view of the magnetic separation device.
Figure 4B:
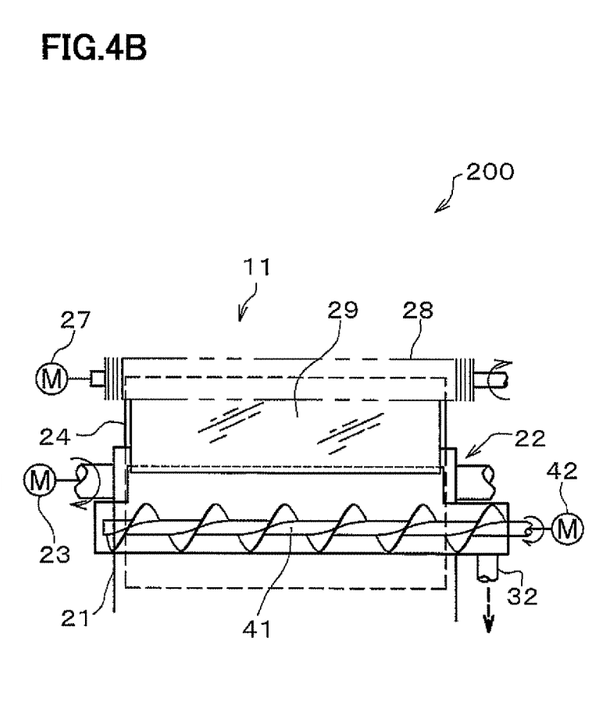

FIG. 4A is a front view and FIG. 4B is a right side view of the magnetic separation device 200. The magnetic separation device 200 is different from the magnetic separation device 10 of the first embodiment in that, in place of the troughs 30, screw feeders 41 are arranged which are driven by motors 42 and have a feeding direction from left to right in FIG. 4B, to allow the coagulated flocs (sludge) scraped by the scrapers 26 to be easily discharged from the sludge discharge channels 32.

Next, layout examples of the raw water treatment apparatus 100 of the present embodiment will be described. Though each layout example described below is applicable to each embodiment described in this specification, an example applied to the present embodiment will be described for convenience.

Figure 5:
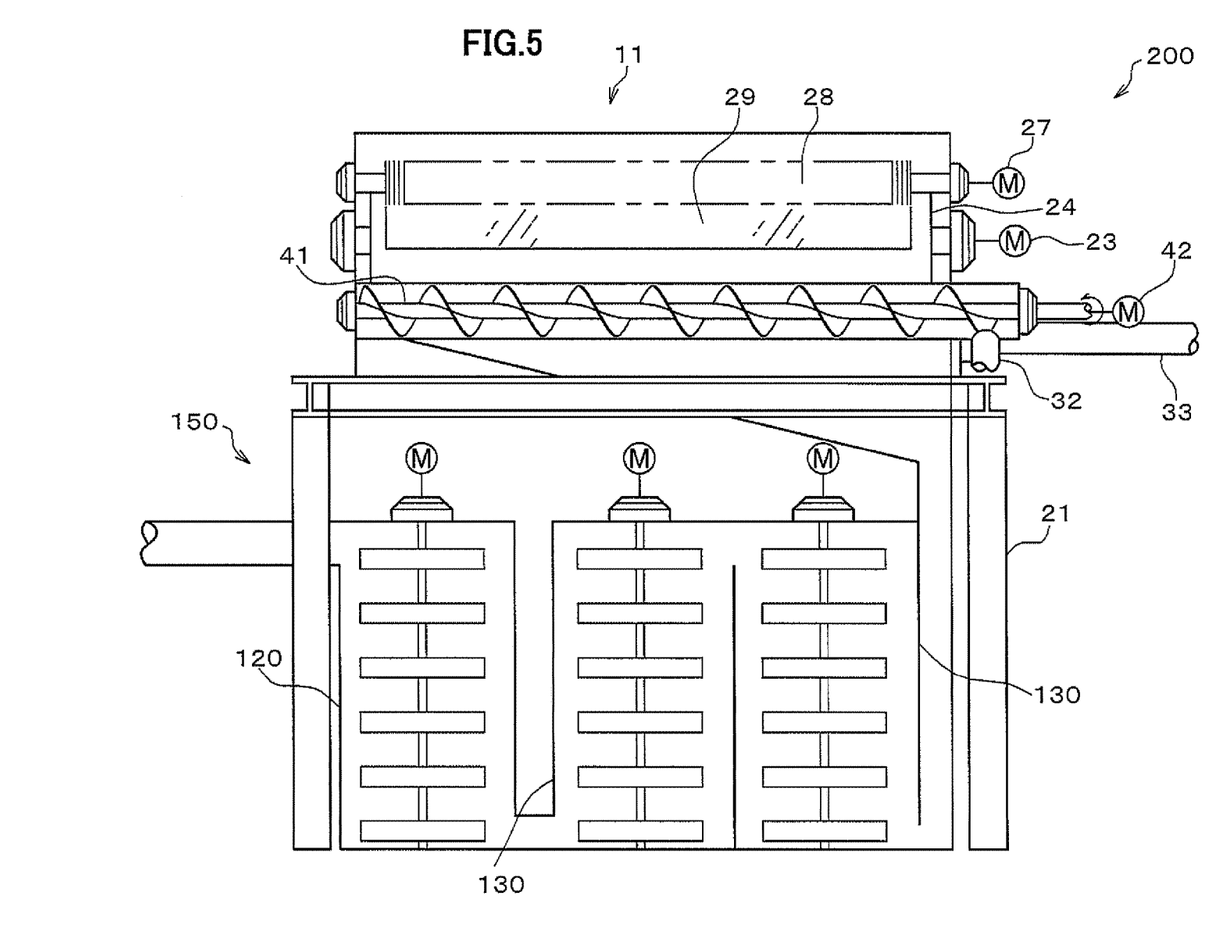
FIG. 5 is a diagram showing one exemplary layout of the magnetic separation device according to the second embodiment of the present invention.

A layout example in FIG. 5 shows the magnetic separation device 200 arranged on the coagulator 150. According to the present example, an installation area of the whole apparatus can be reduced in size.

Figure 6:
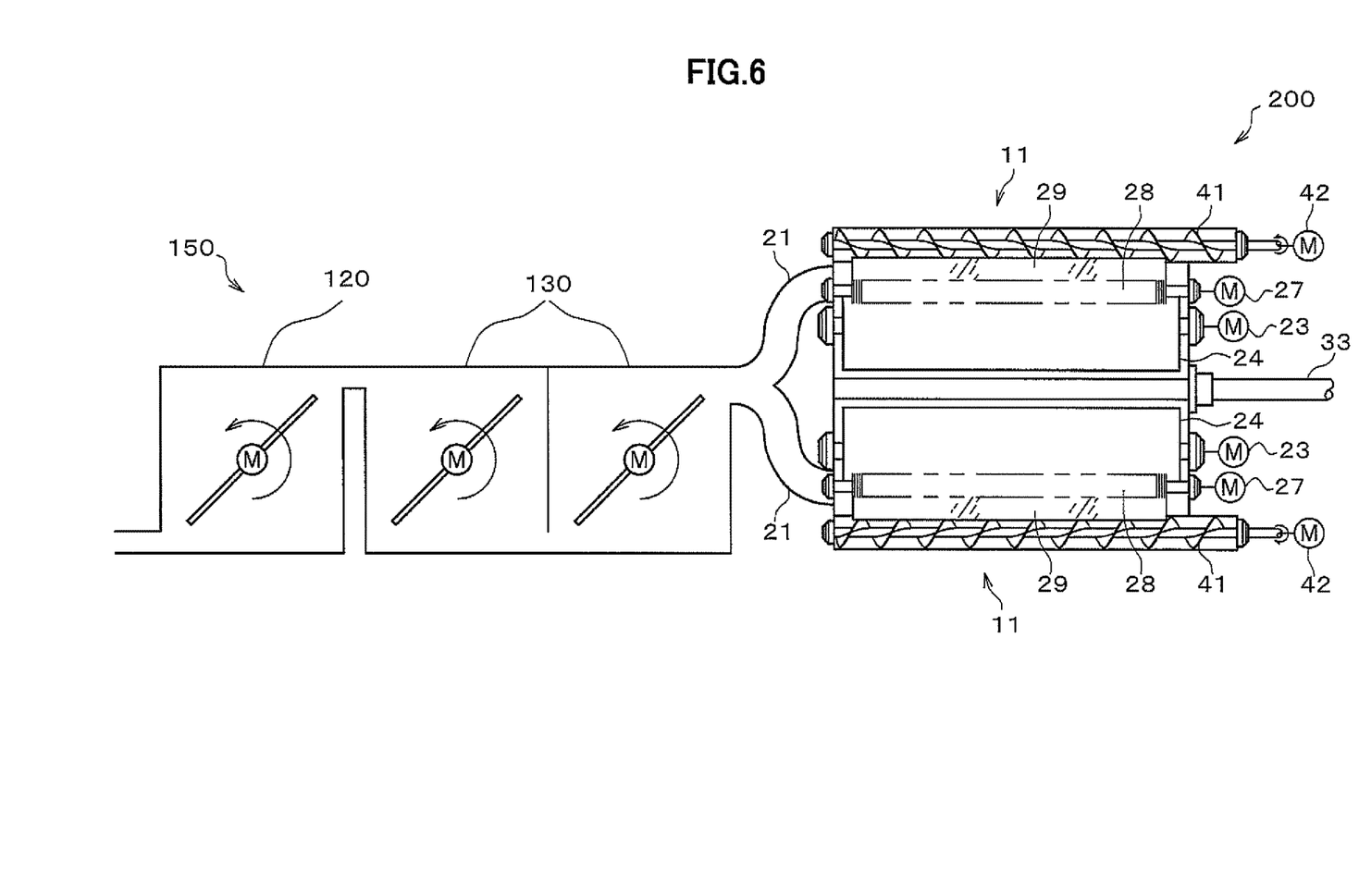
FIG. 6 is a diagram showing another exemplary layout of the magnetic separation device according to the second embodiment of the present invention.

A layout example in FIG. 6 shows the coagulator 150 horizontally arranged with the magnetic separation device 200. The raw water feeding channels 21 that connect the coagulator 150 with the magnetic separation device 200 makes the raw water flow from ends in a longitudinal direction of the magnetic drums 24 in each magnetic separation unit 11.

As other layout examples, though not shown, an example may be considered in which the coagulator 150 is arranged for each magnetic separation unit 11 of the magnetic separation device 200 to separate the coagulators 150 by a system. Thus, the magnetic separation unit 11 can be driven by a system. Further, the raw water feeding channels 21 connecting the coagulator 150 with the magnetic separation device 200 may supply the raw water from a center in the longitudinal direction of the magnetic drum 24 of each magnetic separation unit 11. In this case, by selecting a shape of the raw water feeding channels 21 properly, velocity of the raw water flowing in the longitudinal direction through whole areas in the magnetic drums 24 can be easily made constant.

<Third Embodiment>

In the present embodiment, an example of a magnetic separation device 300 and the raw water treatment apparatus 100 will be described which prevents the coagulated flocs (sludge) from sticking in the apparatus 300.

Basic configurations and operations of the raw water treatment apparatus 100 of the present embodiment are common with those of the above described first embodiment as described with reference to FIG. 1 etc., and detailed descriptions thereof will be omitted. Further, the magnetic separation device 300 of the present embodiment will be described to focus on differences from the magnetic separation device 10 of the first embodiment, and common members bear the same reference numerals to have detailed descriptions thereof omitted.

Figure 7A:
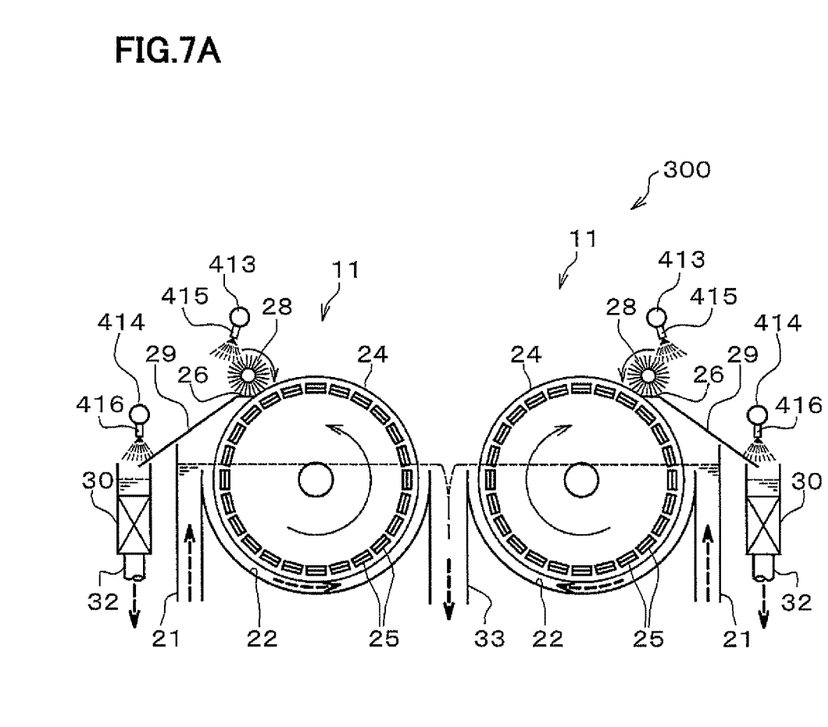
FIG. 7A is a front view of the magnetic separation device and FIG. 7B is a right side view of the magnetic separation device.
Figure 7B:
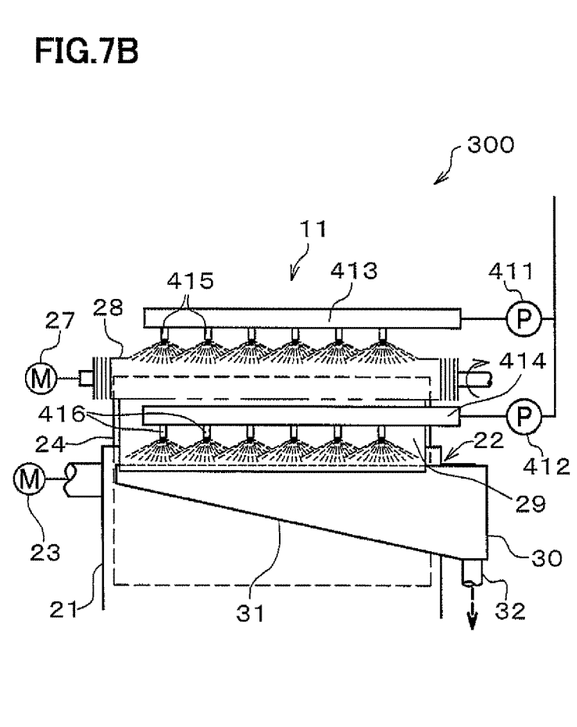

FIG. 7A is a front view and FIG. 7B is a right side view of the magnetic separation device 300. The magnetic separation device 300 is different from the magnetic separation device 10 of the first embodiment in that pumps 411, 412 supply washing water as washing fluid to header tubes 413, 414 and spray nozzles 415, 416 spray the washing water, respectively. The spray nozzles (first spray nozzles) 415 spray the washing water onto the brushes 28 and the spray nozzles (second spray nozzles) 416 spray the washing water onto lower ends of the scraper guides 29 and onto the troughs 30.

According to the third embodiment, the spray nozzles 415 can be used to spray the washing water onto the brushes 28, to prevent the coagulated flocs from sticking and clogging the brushes 28 to cause the brushes 28 to poorly brush the coagulated flocs.

Further, according to the third embodiment, the spray nozzles 416 can be used to spray the washing water onto the lower end of the scraper guides 29 and the troughs 30, to prevent the coagulated flocs from sticking on those parts to cause the coagulated flocs to hardly flow to the sludge discharge channels 32.

It is noted that distinctive configurations of the present embodiment may be applied to the second embodiment described above. That is, the spray nozzles 416 can be used to spray the washing water onto the lower end of the scraper guides 29 and the screw feeders 41, to prevent the coagulated flocs from sticking on those parts to cause the coagulated flocs to hardly flow to the sludge discharge channels 32.

<Fourth Embodiment>

Next, a fourth embodiment will be explained. In this embodiment, an example of a magnetic separation device 400 and the raw water treatment apparatus 100 will be described in which supply sides for the raw water of the two magnetic separation units 11 are arranged to face each other.

Basic configurations and operations of the raw water treatment apparatus 100 of the present embodiment are common with those of the first embodiment as described with reference to FIG. 1, etc., and detailed descriptions thereof will be omitted. Further, the magnetic separation device 400 of the present embodiment will be described to focus on differences from the magnetic separation device 10 of the first embodiment, and common members bear the same reference numerals to have detailed descriptions thereof omitted.

Figure 8:
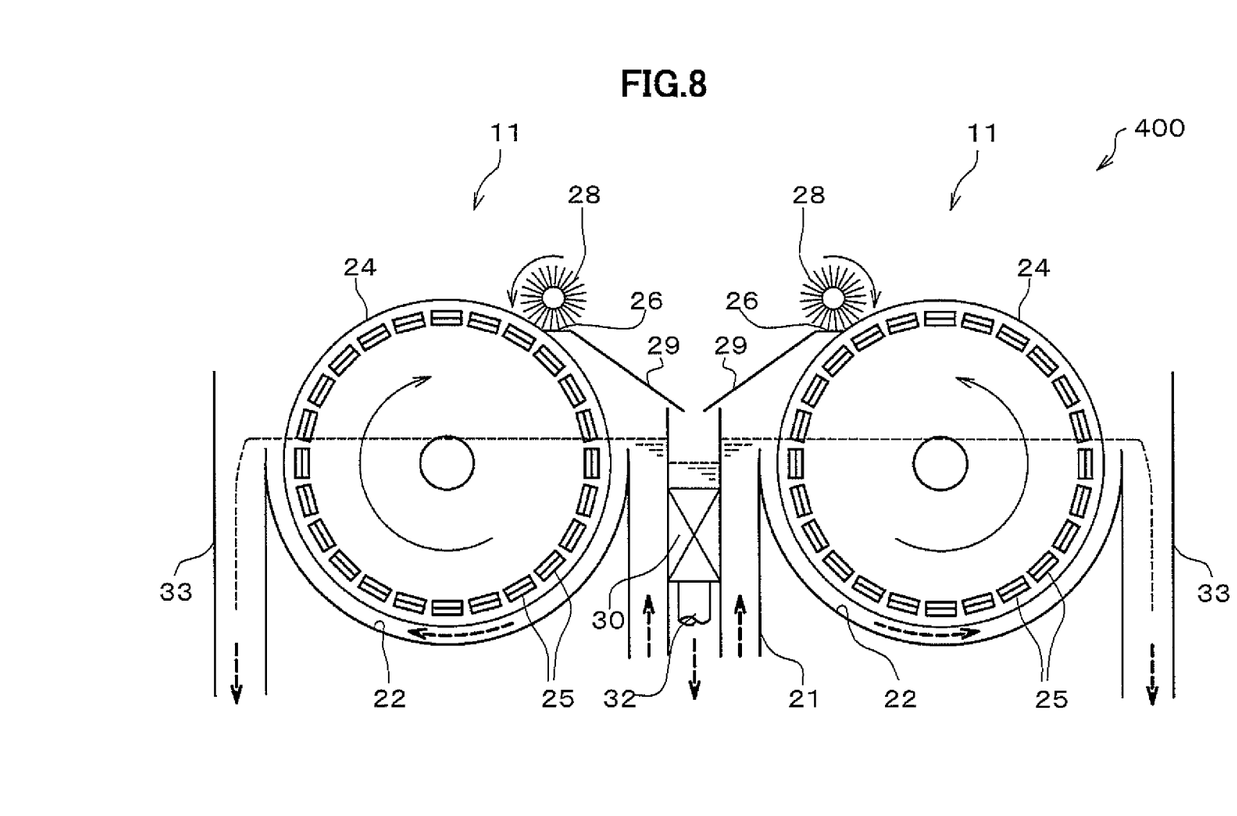
FIG. 8 is an explanatory view for a magnetic separation device according to the fourth embodiment of the present invention.

FIG. 8 is a front view of the magnetic separation device 400. The magnetic separation device 400 is different from the magnetic separation device 10 of the first embodiment in that, first of all, the two magnetic separation units 11 are arranged such that the supply sides for the raw water thereof face each other. That is, the raw water feeding channel 21 is arranged between the two magnetic separation units 11 to be used commonly for the two magnetic separation units 11. With this configuration, each treated water discharge channel 33 of the two magnetic separation units 11 is arranged at the outer right or left in FIG. 8, respectively. Thus, since flow directions of the raw water in the separation tanks 22 are reversed with respect to those in the first embodiment, the magnetic drums 24 in this embodiment are rotated reversely with respect to those in the first embodiment to set, in either of the magnetic separation units 11, the flow directions of the raw water in the separation tanks 22 in the same directions as the rotation directions of the magnetic drums 24. With the change of the rotation directions of the magnetic drums 24, the scraper 26, the brush 28, and the scraper guide 29 are arranged, in each magnetic separation unit 11, in an area (closer to the raw water feeding channel 21) between the two magnetic separation units 11. The trough 30 is also arranged in the raw water feeding channel 21 between the two magnetic separation units 11. In this case, two troughs 30 of the two magnetic separation units 11 can be merged into a single trough 30. That is, the coagulated flocs being fed in the trough 30 tend to cause a trouble such as a blockage and sticking compared with the raw water and the treated water. By arranging only one trough 30 for the two magnetic separation units 11, maintenanceability can be improved.

<Fifth Embodiment>

Next, a fifth embodiment will be described. In the present embodiment, an example of a magnetic separation device 500 and the raw water treatment apparatus 100 will be described which can prevent the coagulated flocs (sludge) from drying to stick in the apparatus 500.

Basic structures and operations of the raw water treatment apparatus 100 of the present embodiment are common with those of the first embodiment as described with reference to FIG. 1, etc., and detailed descriptions thereof will be omitted. Further, the magnetic separation device 500 of the present embodiment will be described to focus on differences from the magnetic separation device 300 of the third embodiment, and common members bear the same reference numerals to have detailed descriptions thereof omitted.

Figure 9:
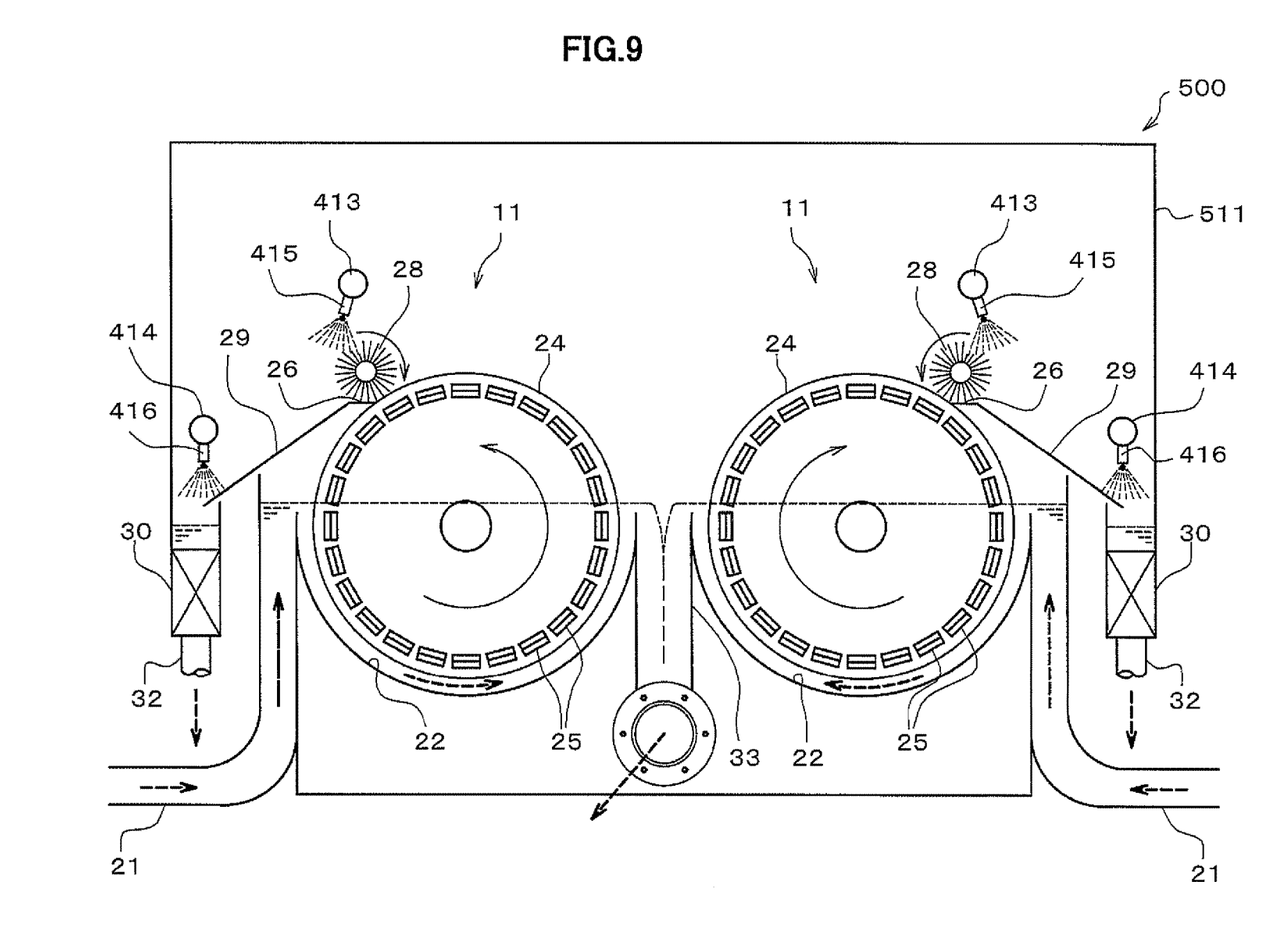
FIG. 9 is an explanatory view for a magnetic separation device according to the fifth embodiment of the present invention.

FIG. 9 is a front view of the magnetic separation device 500. The magnetic separation device 500 is different from the magnetic separation device 300 of the third embodiment in that the two magnetic separation units 11 as a whole are sealingly covered with a cover 511. It is noted that the cover 511 may be arranged with appropriate space or may be an airtight container. If the cover 511 is an airtight container, many advantages can be obtained such as (1) prevention of scattering toxic gas, (2) deoxidation of the treated water (explosion prevention and germ growth inhibition), and (3) prevention of extracting particles in the treated water due to contact with oxygen, in addition to the prevention of aridity and solidification of the coagulated flocs.

In other words, the raw water may contain toxic gas or the like such as hydrogen sulfide. By covering the two magnetic separation units 11 as a whole with the cover 511, the toxic gas or the like can be prevented from flowing to an outside.

Further, if the coagulated flocs (sludge) are dried and solidified, the channels and pumps may be clogged.

By covering the two magnetic separation units 11 as a whole with the cover 511, the spray nozzles 415, 416 can be used to respectively spray the washing water, to sufficiently maintain a wet condition in the cover 511, so that the coagulated flocs can be prevented from drying and solidifying. Therefore, the channels and pumps in the magnetic separation device 500 can be prevented from being clogged with the solidified coagulated flocs.

That is, according to the magnetic separation device 500, the spray nozzles 415, 416 can be used to spray the washing water for washing the brushes 28, the lower end of the scraper guides 29, the troughs 30 and the like to maintain the wet condition in the apparatus such that the coagulated flocs are not dried and solidified.

<Sixth Embodiment>

Next, a sixth embodiment will be descried. In the present embodiment, an example of a magnetic separation device 600 and the raw water treatment apparatus 100 will be described in which the spray nozzles are reduced in number to cut production cost.

Basic configurations and operations of the raw water treatment apparatus 100 of the present embodiment are common with those of the first embodiment as described with reference to FIG. 1, and detailed descriptions thereof will be omitted. Further, the magnetic separation device 600 of the present embodiment will be described to focus on differences from the magnetic separation device 500 of the fifth embodiment, and common members bear the same reference numerals to have detailed descriptions thereof omitted.

Figure 10:
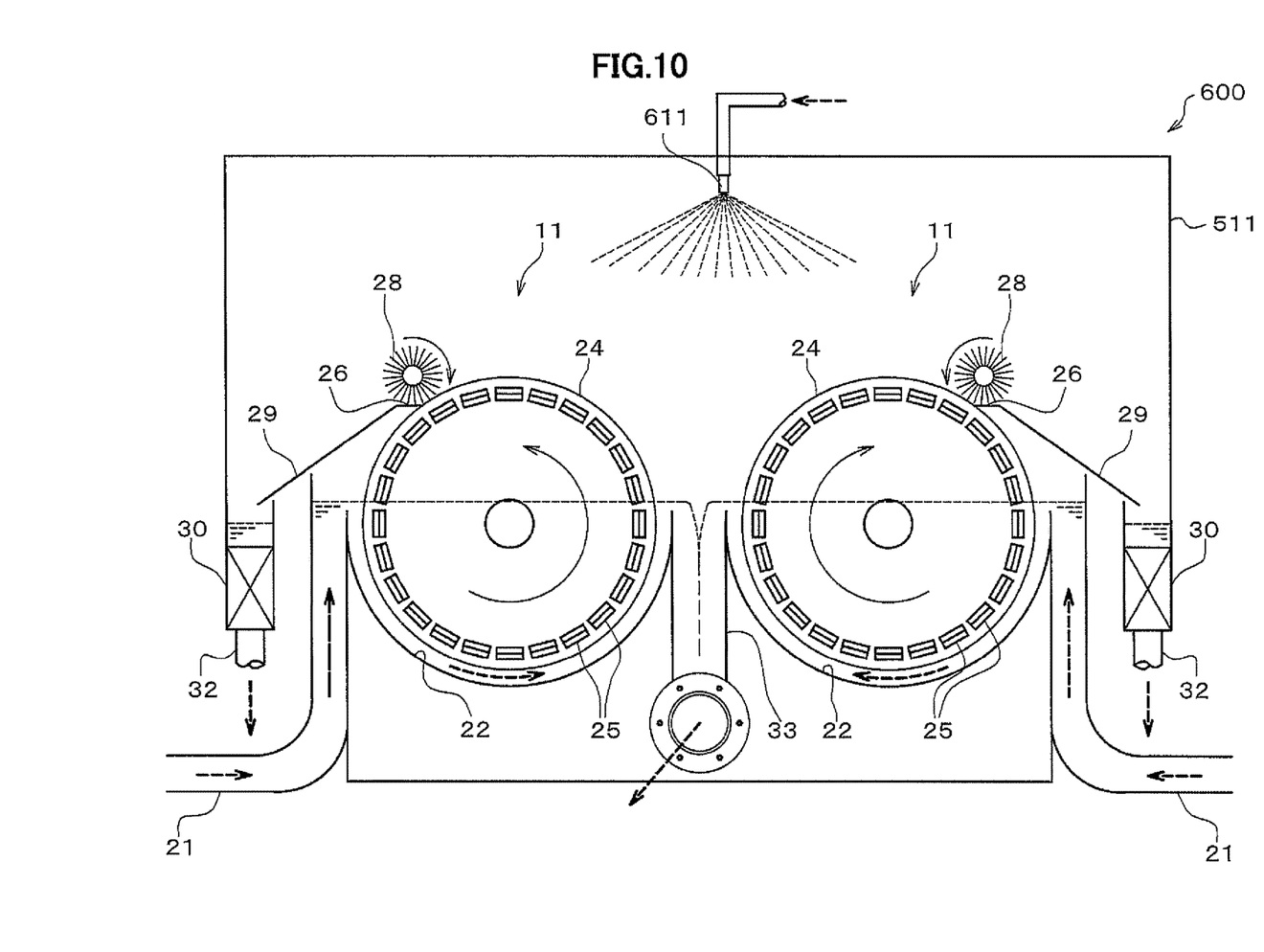
FIG. 10 is an explanatory view for a magnetic separation device according to the sixth embodiment of the present invention.

FIG. 10 is a front view of the magnetic separation device 600. The magnetic separation device 600 is different from the magnetic separation device 300 of the fifth embodiment in that the spray nozzles 415, 416 described above are not arranged, but instead, a spray nozzle 611 (third spray nozzle) is arranged on a ceiling of the cover 511 for spraying liquid such as water to moisten inside the cover 511.

The spray nozzle 611 is used for spraying mist water to moisten inside the cover 511. In the sixth embodiment, with the spray nozzle 611, humidity inside the cover 511 is maintained, for example, at 90% or more, to prevent the coagulated flocs from drying and solidifying. Further, if water temperature of the mist water sprayed from the spray nozzle 611 is, for example, at 30° C. or more, fluidity of the coagulated flocs is effectively enhanced. Still further, a humidity sensor may be installed in the cover 511 to control a spray amount or spray time of the spray nozzle 611 based on a measured value of the sensor.

The spray nozzle 611 does not serve for washing the coagulated flocs (sludge) away, but, by moistening, the coagulated flocs don't easily stick on the brushes 28 and the troughs 30, and the coagulate flocs beginning to sticking on the brushes 28 and the troughs 30 can be come off effectively. Thus, the sixth embodiment can have an advantage over the fifth embodiment to have fewer spray nozzles, leading to reduction in production cost.

It is noted that, though the above embodiments are described with the two magnetic separation units 11, the magnetic separation unit can be further increased in number according to required treatment capability. For example, in a case where three magnetic separation units 11 are used, one more magnetic separation unit may be arranged at the right (or left) side of the two magnetic separation units 11 in FIG. 2, the one more magnetic separation unit 11 being the same as the magnetic separation unit 11 at the left (or right) side in FIG. 2, and the trough 30 may be used commonly. The same can be applied to four or more magnetic separation units 11.

In addition, the present invention is not limited to each embodiment described above and various modifications are included. For example, the embodiments described above are described in detail to clearly explain the present invention and are not necessarily limited to those having all the configurations described above. Further, a part of the configuration in one embodiment can be replaced by a part of the configuration in other embodiments, and the configuration of one embodiment can be added to the configuration in other embodiments. Still further, a part of the configuration in each embodiment can be added or replaced with the configuration in other embodiments, or deleted from the configuration.

REFERENCE SIGNS LIST

10 Magnetic separation device
11 Magnetic separation unit
22 Separation vessel
24 Magnetic drum
26 Scraper
28 Brush
41 Screw feeder
100 Raw water treatment apparatus
150 Coagulator
200 Magnetic separation device
300 Magnetic separation device
400 Magnetic separation device
415 Spray nozzle (First spray nozzle)
416 Spray nozzle (Second spray nozzle)
500 Magnetic separation device
511 Cover
512 Spray nozzle (Third spray nozzle)
600 Magnetic separation device

What is claimed is:

1. A magnetic separation device comprising
a plurality of magnetic separation units that are arranged in raw water, the raw water having a first of the plurality of magnetic separation units arranged therein having a different flow direction from the raw water having a second of the plurality of magnetic separation units arranged therein,
each magnetic separation unit including:
a separation vessel that is supplied with the raw water containing a coagulated floc;
a magnetic drum that is arranged in the separation vessel and rotated to magnetically adsorb the coagulated floc in the raw water; and
a scraper that scrapes the coagulated floc adsorbed on a face of the magnetic drum, wherein
a flow direction of the raw water in the separation vessel is set to the same direction as a rotation direction of the magnetic drum,
wherein the plurality of magnetic separation units are arranged to face each other on discharge sides for treated water in which the coagulated floc has been adsorbed from the raw water.

2. A magnetic separation device comprising
a plurality of magnetic separation units,
each magnetic separation unit including:
a separation vessel that is supplied with the raw water containing a coagulated floc;
a magnetic drum that is arranged in the separation vessel and rotated to magnetically adsorb the coagulated floc in the raw water; and
a scraper that scrapes the coagulated floc adsorbed on a face of the magnetic drum,
wherein a magnet arranged in one magnetic separation unit is set to have a same polarity pole facing a pole of a corresponding magnet arranged in another magnetic separation unit at a position where the magnet in one magnetic separation unit approaches closest to the corresponding magnet in another adjacent magnetic separation unit, as the magnetic separation units rotate, and
wherein the plurality of magnetic separation units are arranged to face each other on discharge sides for treated water in which the coagulated floc has been adsorbed from the raw water.

3. The magnetic separation device according to claim 1, wherein
the magnetic separation unit further includes:
a brush that brushes the coagulated floc attached to the scraper to a discharge side for the coagulated floc; and
a first spray nozzle that sprays washing fluid onto the brush.

4. The magnetic separation device according to claim 3, wherein
the magnetic separation unit further includes a screw feeder that feeds the coagulated floc brushed by the brush to the discharge side.

5. The magnetic separation device according to claim 3, wherein
the magnetic separation unit further includes a second spray nozzle that sprays the washing fluid onto a predetermined position on the discharge side.

6. The magnetic separation device according to claim 1, further comprising
an airtight container that sealingly accommodates the plurality of magnetic separation units.

7. The magnetic separation device according to claim 1, further comprising:
an airtight container that sealingly accommodates the plurality of magnetic separation units; and
a third spray nozzle that sprays fluid for moisten inside the airtight container.

8. A raw water treatment apparatus comprising:
a coagulator that generates a coagulated floc in raw water by adding coagulant and magnetic powder in the raw water for agitation; and
the magnetic separation device according to claim 1 that treats the raw water containing the coagulated floc generated in the coagulator.

9. The magnetic separation device according to claim 2, wherein
the magnetic separation unit further includes:
a brush that brushes the coagulated floc attached to the scraper to a discharge side for the coagulated floc; and
a first spray nozzle that sprays washing fluid onto the brush.

10. The magnetic separation device according to claim 9, wherein
the magnetic separation unit further includes a screw feeder that feeds the coagulated floc brushed by the brush to the discharge side.

11. The magnetic separation device according to claim 9, wherein
the magnetic separation unit further includes a second spray nozzle that sprays the washing fluid onto a predetermined position on the discharge side.

12. The magnetic separation device according to claim 2, further comprising
an airtight container that sealingly accommodates the plurality of magnetic separation units.

13. The magnetic separation device according to claim 2, further comprising:
an airtight container that sealingly accommodates the plurality of magnetic separation units; and
a third spray nozzle that sprays fluid for moisten inside the airtight container.

14. A raw water treatment apparatus comprising:
a coagulator that generates a coagulated floc in raw water by adding coagulant and magnetic powder in the raw water for agitation; and
the magnetic separation device according to claim 2 that treats the raw water containing the coagulated floc generated in the coagulator.

\* \* \* \* \*